United States Patent [19]
Chin

[11] Patent Number: 5,250,804
[45] Date of Patent: Oct. 5, 1993

[54] LOST SCAN LINE DETECTING METHOD AND DEVICE FOR A HANDHELD SCANNER HAVING A LOST LINE COUNTER

[75] Inventor: Robert Chin, Taipei, Taiwan

[73] Assignee: Ultima Electronic Corp., Taipei, Taiwan

[21] Appl. No.: 943,346

[22] Filed: Sep. 10, 1992

[51] Int. Cl.$^5$ .............................................. H01J 3/14
[52] U.S. Cl. ...................... 250/234; 382/65; 382/59; 358/473
[58] Field of Search ............... 250/208.2, 214 R, 234, 250/208.1; 382/62, 65, 58, 59; 358/473–483; 235/419, 456

[56] References Cited

U.S. PATENT DOCUMENTS 4,590,609 5/1986 Chevalet et al. .................. 250/208.2
4,707,747 11/1987 Rockwell, III ........................ 382/59

*Primary Examiner*—David C. Nelms
*Assistant Examiner*—Que T. Le
*Attorney, Agent, or Firm*—Pennie & Edmonds

[57] ABSTRACT

A lost scan line detecting device provides lost scan line information to a computer system which is connected to and which receives scan line picture data from a handheld scanner, thereby enabling the computer system to derive picture data which corresponds to a lost scan line from available scan line picture data. The handheld scanner generates a series of photo receiver pulses and a series of step trigger signals. Each of the photo receiver pulses is used to indicate that the handheld scanner has traveled by a distance which is equivalent to one scan line on a document being scanned. The handheld scanner generates each of the step trigger signals after one of the photo receiver pulses has been generated. The period between two step trigger signals is constant and corresponds to a predetermined maximum scanning speed of the handheld scanner. The lost scan line detecting device includes a first counter to count the photo receiver pulses and a second counter to count the step trigger signals. The count outputs of the first and second counters are compared, and a lost scan line signal is generated whenever the count outputs are unequal so as to indicate to the computer system that a lost scan line condition has occurred.

9 Claims, 2 Drawing Sheets

LOST SCAN LINE DETECTING METHOD AND DEVICE FOR A HANDHELD SCANNER HAVING A LOST LINE COUNTER

BACKGROUND OF THE INVENTION

1. Field of the Invention

The invention relates to a handheld scanner, more particularly to a lost scan line detecting method and device for a handheld scanner.

2. Description of the Related Art

Handheld scanners are widely used in office automation and are applied in picture processing and in character recognition operations. When activated, the handheld scanner generates a light output which is reflected by the document being scanned. The reflected light is received by a charge coupled device (CCD) and is converted into a corresponding analog voltage signal. The analog voltage signal is then processed by an image processing circuit and is converted into a digital bit stream which serves as scan line picture data. The computer system stores the received digital bit stream in a display memory region, thereby enabling the computer system to show the scanned document on the computer monitor.

The handheld scanner should be moved in a direction which is transverse to the scan line when a document is scanned. The handheld scanner includes a roller mechanism which moves along the document in the transverse direction. The roller mechanism rotatably drives a speed reducing gear unit which is connected to a photo interrupter that is provided between a photo emitter and a photo receiver. Movement of the roller mechanism therefore causes the photo receiver to generate a series of pulse signals. Each pulse signal is used to indicate that the roller mechanism has moved by a distance which corresponds to one scan line on the document being scanned. During the period between two pulse signals, the light received by the CCD should have been converted into a digital bit stream and transmitted to the scanner interface card. Otherwise, overlapping of two scan lines will occur.

Therefore, the period (also known as the accumulation period) which starts when light is converted into a digital signal and which ends when the digital signal is transmitted to the scanner interface card should be less than that between two pulse signals from the photo receiver. However, since the handheld scanner is manually driven, the speed of the roller mechanism is not constant, thereby possibly resulting in the generation of two pulse signals within the accumulation period to result correspondingly in lost scan lines and inferior picture quality of the scanned document shown on the computer monitor.

Referring to FIG. 1, a conventional handheld scanner generates a step trigger (ST) signal after one of the photo receiver pulses and an address reset (AR) signal which is used to indicate that a new line is to be scanned. The period between two step trigger (ST) signals and that between two address reset (AR) signals is constant and corresponds to a predetermined maximum scanning speed of the handheld scanner. It is possible to have a plurality of scanning periods between two step trigger (ST) signals. However, each scanning period should correspond to the same scan line. The computer system receives the scan line picture data which corresponds to the first scanning period and disregards the rest. If the picture data of the scanning periods are the same, this means that the speed of the roller mechanism is lower than the maximum scanning speed. No lost scan lines will occur under this condition.

Note that only one step trigger (ST) signal is present even if two or more photo receiver pulses are generated during the period between two address reset (AR) signals. The presence of two or more photo receiver pulses during the period between two address reset (AR) signals indicates that the speed of the roller mechanism is greater than the maximum scanning speed. The picture data (Vd) corresponding to only one of the photo receiver pulses is considered, while the rest are disregarded, thereby resulting in lost scan lines.

The scanner interface card of the handheld scanner is usually provided with a data buffer in order to overcome incompatibilities between the read cycle of the computer system and the scanning speed. If the computer system is burdened with several tasks, it is possible that the computer system will not be able to retrieve timely the scan line picture data which were stored in the data buffer. The data buffer is eventually filled and will not be able to receive additional data. Succeeding scan line picture data are not stored and are thus lost.

SUMMARY OF THE INVENTION

Therefore, the objective of the present invention is to provide a lost scan line detecting method and device for providing lost scan line information to a computer system which is connected to and which receives scan line picture data from a handheld scanner so as to enable the computer system to derive picture data which corresponds to a lost scan line from available scan line picture data, thereby resulting in better picture quality of a scanned document shown on the computer monitor of the computer system.

Accordingly, the lost scan line detecting device of the present invention is to be used with a computer system and a handheld scanner. The handheld scanner generates a series of photo receiver pulses and a series of step trigger signals when in use. Each of the photo receiver pulses indicates that the handheld scanner has traveled by a distance which is equivalent to one scan line on a document being scanned. The handheld scanner generates each of the step trigger signals after one of the photo receiver pulses has been generated. The period between two step trigger signals is constant and corresponds to a predetermined maximum scanning speed of the handheld scanner. The handheld scanner has a data buffer for storing temporarily the scan line picture data prior to retrieval by the computer system therefrom. The data buffer generates a buffer full signal when filled.

The lost scan line detecting device comprises a first counter means for counting the photo receiver pulses, a second counter means for counting the step trigger signals, said second counter means being disabled by the buffer full signal from the data buffer, and a comparator means for comparing count outputs of the first and second counter means and for generating a lost scan line signal whenever the count outputs are unequal so as to indicate to the computer system that a lost scan line condition has occurred.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
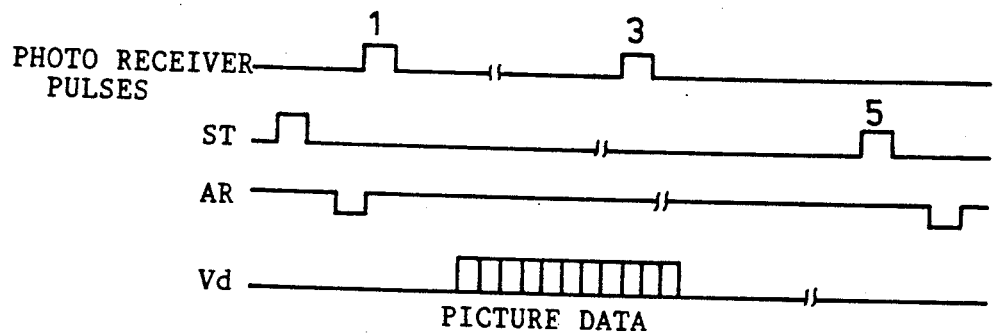
FIG. 1 is a sample timing diagram which illustrates the operation of a conventional handheld scanner.
Figure 2:
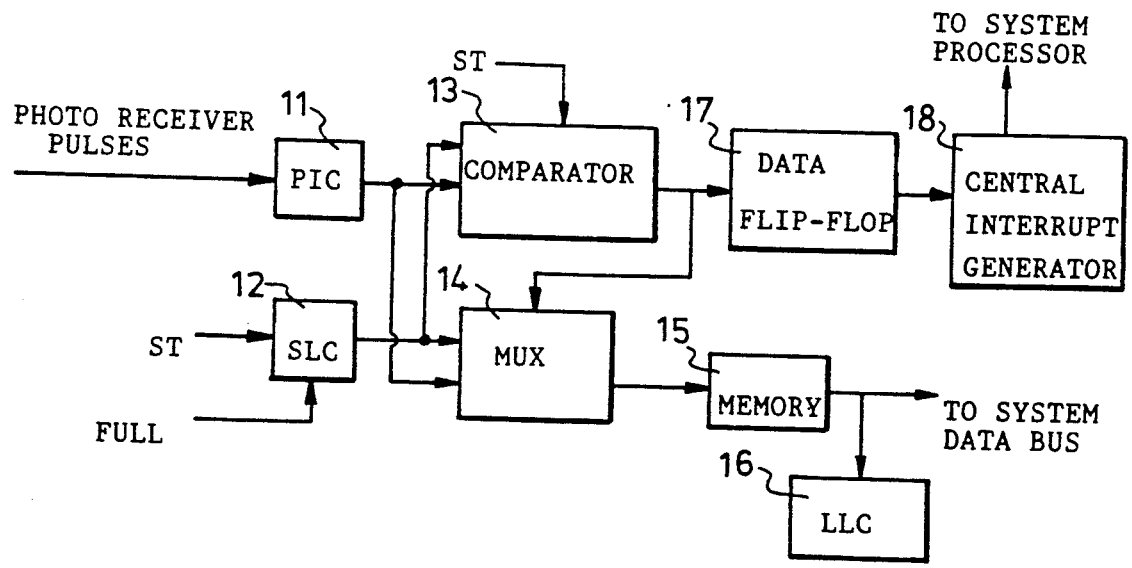
FIG. 2 is a schematic circuit block diagram of the first preferred embodiment of a lost scan line detecting device of the present invention.

Referring to FIG. 2, the first preferred embodiment of a lost scan line detecting device according to the present invention is shown to comprise a photo interrupt counter (PIC) (11), a scan line counter (SLC) (12), a comparator unit (13), a multiplexer unit (MUX) (14), a memory unit (15), a lost line (LLC) counter (16), a data flip-flop (17) and a central interrupt generator (18).

The PIC (11) receives the photo receiver pulses from the handheld scanner and generates a count output which corresponds to the total distance traveled by the handheld scanner on the document being scanned. The SLC (12) receives the step trigger (ST) signal and a buffer full (FULL) signal from the data buffer of the handheld scanner. Under normal circumstances, the count output of the PIC (11) should be equal to that of the SLC (12). Note that only one step trigger (ST) signal is present even if two or more pulse signals are generated during the period between two address reset (AR) signals. The count output of the PIC (11) becomes greater than that of the SLC (12) to indicate that a lost scan line condition has occurred. If the data buffer is full, the buffer full (FULL) signal is generated, thereby disabling the SLC (12). The count output of the PIC (11) similarly becomes greater than that of the SLC (12) to indicate that a lost scan line condition has occurred.

The comparator unit (13) is enabled by the step trigger (ST) signal so as to compare the count outputs of the PIC (11) and the SLC (12). No lost scan line condition has occurred if the count outputs of the PIC (11) and the SLC (12) are equal. If the count outputs of the PIC (11) and the SLC (12) are unequal, the comparator unit (13) generates a lost scan line signal which is received by the data flip-flop (17). The data flip-flop (17) generates a corresponding signal to the central interrupt generator (18) to indicate to the same that a lost scan line condition has occurred. The system processor of the computer system may be configured so as to receive or not to receive an interrupt signal from the central interrupt generator (18). If the system processor is configured to receive the interrupt signal, operation of the computer system is interrupted upon reception of the interrupt signal in order to enable the computer system to derive the picture data which corresponds to the lost scan line from the available scan line picture data. Otherwise, the lost scan line signal from the comparator unit (13) is used to enable the MUX (14) so as to record the count outputs of the PIC (11) and the SLC (12) in the memory unit (15). The difference in the count outputs of the PIC (11) and the SLC (12) indicates the number of lost scan lines. The count output of the LLC (16) is incremented automatically by one unit each time a lost scan line condition occurs.

After the count outputs have been recorded in the memory unit (15), the count output of the PIC (11) is loaded into the SLC (12). The count outputs of the PIC (11) and the SLC (12) then become equal, thereby permitting a continuation in the lost scan line detecting process.

After the scanning operation has been completed, the system processor reads the contents of the LLC (16) in order to determine whether a lost scan line condition has occurred. If a lost line condition has occurred, the system processor reads the contents of the memory unit (15) and then, with the aid of a computer program, derives the picture data which corresponds to the lost scan lines from the available scan line picture data. Several methods are applicable when deriving the picture data corresponding to the lost scan lines. Derivation of the picture data can be accomplished by copying the immediately preceding or immediately succeeding scan line picture data or by averaging the electrical values of the immediately preceding and the immediately succeeding scan line picture data.

Figure 3:
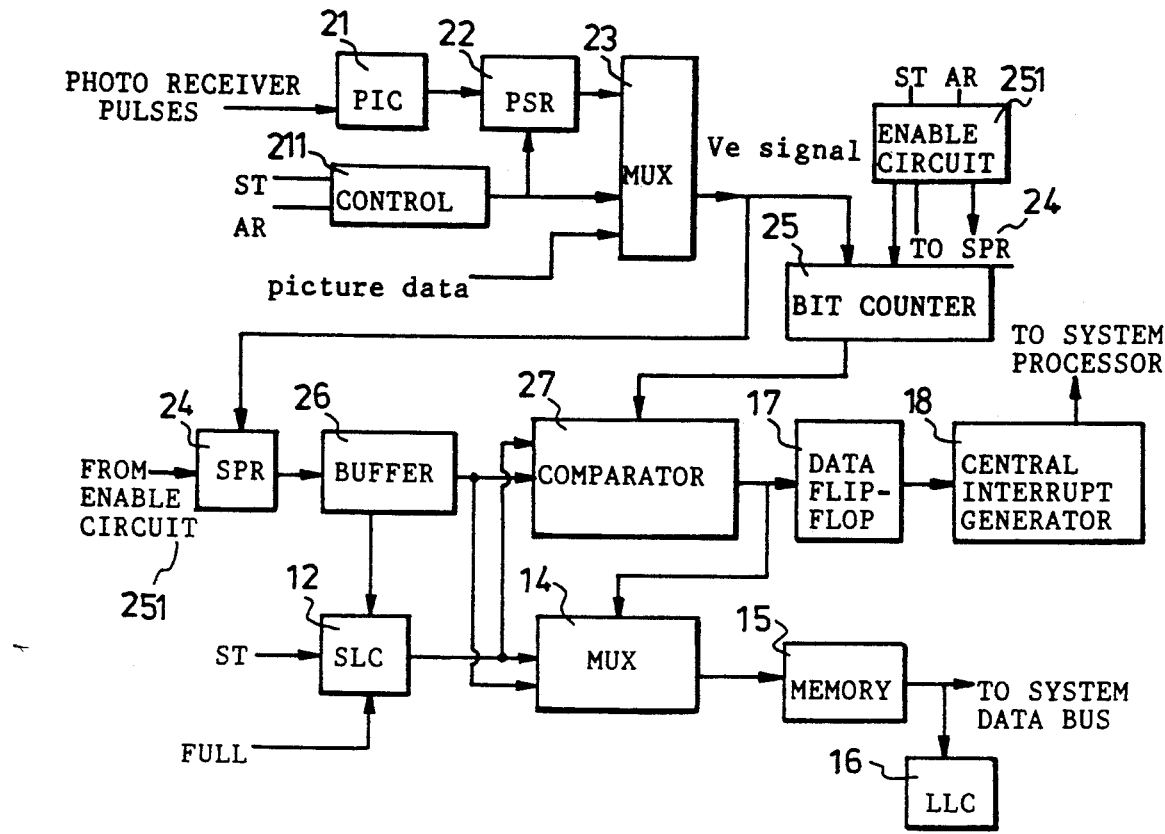
FIG. 3 is a schematic circuit block diagram of the second preferred embodiment of a lost scan line detecting device of the present invention.

The second preferred embodiment of a lost line detecting device according to the present invention is shown in FIG. 3. The second preferred embodiment complies with current handheld scanner signaling standards and is substantially similar to the first preferred embodiment. The main difference between the first and second preferred embodiments is that, in the latter embodiment, the photo receiver pulse is not an input signal to the scanner interface card.

Figure 4:
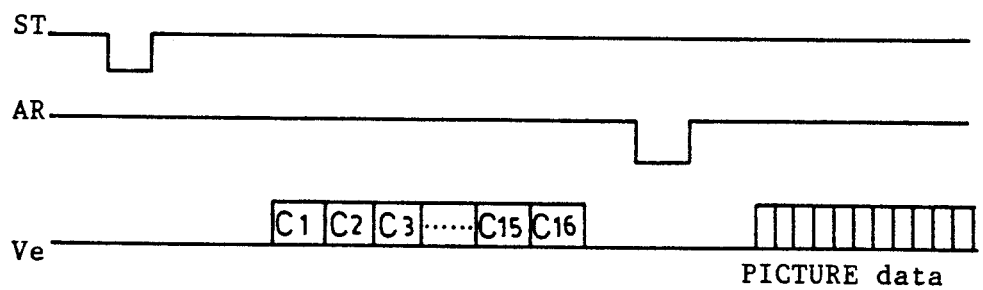
FIG. 4 is a timing diagram which illustrates the operation of the second preferred embodiment.

Referring to FIG. 3, the second preferred embodiment includes a photo interrupt counter (PIC) (21) which receives the photo receiver pulses and which generates a count output that corresponds to the total distance traveled by the handheld scanner on the document being scanned. The count output of the PIC (21) is converted into a serial bit stream by a parallel-to-serial shift register (PSR) (22). The serial bit stream from the PSR (22) and the picture data corresponding to one scan line are received by a multiplexer unit (MUX) (23). A control generator (211) receives the step trigger (ST) signal and the address reset (AR) signal. Referring to FIG. 4, upon reception of the step trigger (ST) signal, the control generator (211) activates the PSR (22) and controls the MUX (23) to provide the count output of the PIC (21) at the output line thereof. Upon reception of the address reset (AR) signal, the control generator (211) deactivates the PSR (22) and controls the MUX (23) to provide the picture data at the output line thereof. Therefore, the Ve signal at the output line of the MUX (23) is a composite signal which includes the scan line number and the picture data corresponding to the scan line number. The scan line number comprises 16 bits and is present during the period between the step trigger (ST) signal and the address reset (AR) signal. The picture data is present during the period between the address reset (AR) signal and the succeeding step trigger (ST) signal.

The Ve signal is a standard input signal to the scanner interface card and is simultaneously received by a serial-to-parallel shift register (SPR) (24) and by a bit counter (25). An enable circuit (251) receives the step trigger (ST) signal and the address reset (AR) signal and enables both the SPR (24) and the bit counter (25) during the duration between the step trigger (ST) signal and the address reset (AR) signal. The SPR (24) converts the scan line number from the Ve signal into a parallel count output and loads the same into a buffer (26). The bit counter (25) monitors the number of bits from the MUX (23). After verifying that the 16-bit scan line number from the MUX (23) has been transmitted to the SPR (24), the bit counter (25) activates a comparator unit (27). The comparator unit (27) compares the output of the buffer (26) and the count output of the SLC (12). If both outputs are unequal, the comparator unit (27) generates a lost scan line signal which is received by the data flip-flop (17). The remaining operations are similar to those of the first preferred embodiment and will not be detailed further.

It has thus been shown that the lost scan line detecting device of the present invention provides a fast and efficient method for detecting the presence of a lost scan line. The lost scan line detecting device indicates the number and the location of the lost scan lines and provides these information to a computer system. The computer system derives the picture data which correspond to the lost scan lines from the available scan line picture data, thereby resulting in better picture quality of a scanned document shown on the computer monitor of the computer system.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A lost scan line detecting method for providing lost scan line information to a computer system which is connected to and which receives scan line picture data from a handheld scanner so as to enable said computer system to derive picture data which corresponds to a lost scan line from available scan line picture data, said handheld scanner generating a series of photo receiver pulses and a series of step trigger signals, each of said photo receiver pulses indicating that said handheld scanner has traveled by a distance which is equivalent to one scan line on a document being scanned, said handheld scanner generating each of said step trigger signals after one of said photo receiver pulses has been generated, the period between two said step trigger signals being constant and corresponding to a predetermined maximum scanning speed of said handheld scanner, said method comprising the steps:

providing a first counter means to count said photo receiver pulses;
providing a second counter means to count said step trigger signals; and
providing a comparator means to compare count outputs of said first and second counter means and to generate a lost scan line signal whenever said count outputs are unequal so as to indicate to said computer system that a lost scan line condition has occurred.

2. The lost scan line detecting method as claimed in claim 1, further comprising the step:

providing a multiplexer means which receives said count output of said first counter means and said scan line picture data from said handheld scanner and which provides a composite signal that includes said count output of said first counter means and corresponding said scan line picture data to said computer system.

3. The lost scan line detecting method as claimed in claim 1, further comprising the steps:

recording said count outputs of said first and second counter means in a memory unit whenever the lost scan line condition occurs;
after recording, loading said count output of said first counter means into said second counter means; and
controlling said computer system so as to retrieve said count outputs recorded in said memory unit after scanning has been completed.

4. The lost scan line detecting method as claimed in claim 3, wherein said recording step comprises the step:

providing a multiplexer means controlled by said lost scan line signal from said comparator means so as to record said count outputs of said first and second counter means in said memory unit whenever the lost scan line condition occurs.

5. The lost scan line detecting method as claimed in claim 1, further comprising the step:

providing a central interrupt generator means controlled by said lost scan line signal from said comparator means so as to generate an interrupt signal to said computer system and enable said computer system to derive the picture data which corresponds to the lost scan line whenever the lost scan line condition occurs.

6. A lost scan line detecting device for providing lost scan line information to a computer system which is connected to and which receives scan line picture data from a handheld scanner so as to enable said computer system to derive picture data which corresponds to a lost scan line from available scan line picture data, said handheld scanner generating a series of photo receiver pulses and a series of step trigger signals, each of said photo receiver pulses indicating that said handheld scanner has traveled by a distance which is equivalent to one scan line on a document being scanned, said handheld scanner generating each of said step trigger signals after one of said photo receiver pulses has been generated, the period between two said step trigger signals being constant and corresponding to a predetermined maximum scanning speed of said handheld scanner, said handheld scanner having a data buffer for storing temporarily said scan line picture data prior to retrieval by said computer system therefrom, said data buffer generating a buffer full signal when filled, said lost scan line detecting device comprising:

a first counter means for counting said photo receiver pulses;
a second counter means for counting said step trigger signals, said second counter means being disabled by said buffer full signal from said data buffer; and
a comparator means for comparing count outputs of said first and second counter means and for generating a lost scan line signal whenever said count outputs are unequal so as to indicate to said computer system that a lost scan line condition has occurred.

7. The lost scan line detecting device as claimed in claim 6, further comprising a memory unit and a first multiplexer means receiving said count outputs of said first and second counter means and controlled by said lost scan line signal from said comparator means so as to record said count outputs in said memory unit whenever the lost scan line condition occurs, said count output of said first counter means being loaded into said second counter means after said count outputs have been recorded in said memory unit;

whereby, said computer system retrieves said count outputs recorded in said memory unit after scanning has been completed.

8. The lost scan line detecting device as claimed in claim 6, further comprising a central interrupt generator means controlled by said lost scan line signal from said comparator means so as to generate an interrupt signal to said computer system and enable said computer system to derive the picture data which corresponds to the lost scan line whenever the lost scan line condition occurs.

9. The lost scan line detecting device as claimed in claim 7, wherein said first counter means comprises:

a photo interrupt counter receiving said photo receiver pulses from said handheld scanner and having a count output corresponding to the total distance traveled by said handheld scanner on the document being scanned;

a first shift register means for converting said count output of said photo interrupt counter into a serial bit stream;

a second multiplexer means receiving said serial bit stream of said first shift register means and said scan line picture data from said handheld scanner, said second multiplexer means providing a composite signal that includes said serial bit stream and corresponding said scan line picture data to said computer system; and a second shift register means receiving said serial bit stream from said composite signal and providing a corresponding parallel count output to said first multiplexer means.

* * * * *